United States Patent
Karl

(10) Patent No.: US 6,286,327 B1
(45) Date of Patent: *Sep. 11, 2001

(54) REFRIGERANT FLUID CIRCUIT INCLUDING AN AIR CONDITIONING LOOP AND A HEATING LOOP, IN PARTICULAR FOR A MOTOR VEHICLE

(75) Inventor: Stefan Karl, Paris (FR)

(73) Assignee: Valeo Climatisation, La Verriere (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/987,692

(22) Filed: Dec. 9, 1997

(30) Foreign Application Priority Data

Dec. 9, 1996 (FR) .................................... 96 15099

(51) Int. Cl.[7] .............................. F25B 41/00; F25B 49/00
(52) U.S. Cl. ..................... 62/196.4; 62/174; 62/DIG. 17
(58) Field of Search .................................. 62/159, 196.4, 62/205, 207, 244, 504, 10, 117, DIG. 17, 174

(56) References Cited

U.S. PATENT DOCUMENTS

| | | |
|---|---|---|
| 3,402,566 | 9/1968 | Leimbach . |
| 4,240,266 | 12/1980 | Scrine et al. . |
| 4,523,436 * | 6/1985 | Schedel et al. ........................ 62/222 |
| 4,785,640 * | 11/1988 | Naruse ................................ 62/196.4 |
| 4,986,085 * | 1/1991 | Tischer ................................ 62/225 |
| 5,000,009 * | 3/1991 | Clanin ............................... 62/225 X |
| 5,095,715 | 3/1992 | Dudley ............................... 62/228.4 |
| 5,113,668 | 5/1992 | Wachs, III et al. .................... 62/305 |
| 5,291,941 * | 3/1994 | Enomoto et al. ............... 62/196.4 X |

FOREIGN PATENT DOCUMENTS

| | | |
|---|---|---|
| 406 261 | 1/1966 | (CH) . |
| 0 295 377 | 12/1988 | (EP) . |
| 0 682 217 | 5/1995 | (EP) . |
| 2 398 275 | 2/1979 | (FR) . |
| 2 717 126 | 3/1994 | (FR) . |
| 2 236 870 | 4/1991 | (GB) . |
| WO 95/24323 | 9/1995 | (WO) . |

OTHER PUBLICATIONS

French Search Report dated Aug. 29, 1997.

* cited by examiner

Primary Examiner—William Wayner
(74) Attorney, Agent, or Firm—Morgan & Finnegan, LLP

(57) ABSTRACT

A refrigerant fluid circuit for a motor vehicle includes an air conditioning loop and a heating loop, the heating loop comprising a heating branch. A variable opening valve is connected in the heating loop. This valve is controllable so as not only to control the distribution of the refrigerant fluid flowing in the circuit into the heating loop, but also to control the expansion of the fluid in its gaseous state in the heating loop in the additional heating mode.

24 Claims, 2 Drawing Sheets

REFRIGERANT FLUID CIRCUIT INCLUDING AN AIR CONDITIONING LOOP AND A HEATING LOOP, IN PARTICULAR FOR A MOTOR VEHICLE

FIELD OF THE INVENTION

This invention relates to apparatus for air conditioning the cabin of a motor vehicle. More particularly, the invention relates to a refrigerant fluid circuit for such an apparatus, the circuit being of the type comprising an air conditioning loop and also a heating loop, providing space heating, the heating loop comprising a heating branch of the circuit in which there are connected distribution means and expansion means.

BACKGROUND OF THE INVENTION

A refrigerant fluid circuit of the above type is known from French patent specification FR 2 717 126A, and from the specification of French patent application no. 9611325. The refrigerant fluid is able to flow either in the air conditioning loop, with the circuit operating as a conventional air conditioning circuit, or in the heating loop, in which case the circuit is then operating as a heating circuit which gives additional heating.

In a circuit of that type, as is explained in particular in French patent specification no. 9611325, the distribution means in the heating branch comprise a stop valve of the two-way type, which is preferably an electromechanical valve. This stop valve, which operates on a "all or nothing" basis, is controlled in coordination with a further stop valve which is connected in the second branch, in such a way that they together constitute a fluid flow switching means for controlling the flow of fluid in the air conditioning loop or in the heating loop.

In this known circuit, expansion means are also provided, being connected in the heating loop downstream of the distribution means with respect to the direction of flow of the refrigerant fluid. This expansion means, which enables the flow of refrigerant fluid in the heating branch to be interrupted or restricted momentarily, is preferably made in the form of a differential pressure regulator which enables the refrigerant fluid to flow only when the pressure difference between its inlet and its outlet exceeds a predetermined threshold value.

Thus, in this known circuit, it is necessary to provide two different means so as to ensure, on the one hand, the function of distribution of the refrigerant fluid into the heating loop, and on the other hand, the function of expansion of the refrigerant fluid in the gaseous state. The known circuit thus has the disadvantage that it calls for two components to fulfil these two functions, and this adds to the size of the apparatus.

In addition, the differential pressure regulator interposed in the heating branch does not enable the quantity of refrigerant fluid flowing in the heating loop to be perfectly controlled as a function of demand.

DISCUSSION OF THE INVENTION

A main object of the invention is to overcome the above mentioned drawbacks.

According to the invention in a first aspect, a refrigerant fluid circuit for a motor vehicle, of the type comprising an air conditioning loop together with a heating loop which includes a heating branch in which distribution means and expansion means are connected, is characterised in that the distribution means and expansion means are in the form of a single component which is a variable opening valve connected in the said heating branch.

This variable opening valve not only enables the expansion of the gaseous refrigerant fluid in the heating branch to be controlled (that is to say in an additional heating mode), but also enables the heating branch of the circuit to be isolated when the circuit is operating in the air conditioning mode.

The use of a variable opening valve also enables the refrigerant fluid circuit to be simplified because this valve combines the expansion means and the distribution means, namely the stop valve, into a single component. In addition, this valve enables two additional functions to be provided, in that it enables the expansion to be controlled, for example from an electronic regulating module, and also enables the time delay before opening of the expansion device to be controlled in the charging mode. This enables the quantity of refrigerant fluid charged into the circuit to be controlled more effectively. Thus, switching of the refrigerant fluid into the heating loop, and expansion of the fluid, are carried out by one valve which controls the mass flow of the fluid over the whole range of 0% to 100% of its nominal mass flow rating.

In one preferred embodiment of the invention, the variable opening valve is an electromechanical valve in the form of either a gate valve or a proportional valve governed by a pulse width modulated signal.

According to a preferred feature of the invention, the variable opening valve is governed by a control unit. Preferably, the control unit is connected to means for measuring the pressure of the refrigerant fluid at a selected point in the circuit.

The invention is particularly applicable to a refrigerant fluid circuit of the type comprising a first branch containing an evaporator followed by a compressor, a second branch containing a condenser, and a third branch containing no condenser, the said third branch constituting the said heating loop. In such a circuit, the variable opening valve is preferably connected in the said third branch of the circuit.

Such a circuit, preferably, further includes means for switching the fluid flow, arranged to deliver the fluid leaving the first branch selectively either into the second branch or into the third branch. In that case, according to another preferred feature of the invention, the fluid flow switching means comprises a first valve connected in the second circuit branch upstream of the compressor, and a second valve connected in the third branch, the said second valve being the said variable opening valve.

Thus, diversion or switching of the fluid flow is carried out by a stop valve connected in the second branch, together with a variable opening valve connected in the third branch, the variable opening valve enabling the various functions mentioned above to be achieved.

According to a further preferred feature of the invention, the first valve and the variable opening second valve are associated with a control unit.

In a preferred embodiment of the invention, the first valve and the variable opening second valve are incorporated in a common valve module. In that case, preferably, the valve module has a body in the form of a monobloc member in which the first valve and the variable opening second valve are contained, the said monobloc member having first, second and third ports for connection to the said first, second and third circuit branches respectively.

In preferred versions of this last mentioned arrangement, the monobloc body of the valve module has an internal passage which puts the first port (and the compressor outlet) into communication with the first valve (and the second branch) and the variable opening second valve (and the third branch), the first valve and the variable opening second valve being connected to the second port and the third port respectively.

In preferred embodiments of the invention, the second and third ports are open in a main face of the monobloc body of the value module while the first port is open in an end face of the body.

In some versions of the invention, the monobloc body of the valve module further has a fourth port for connection to a pressure sensor. Preferably, the said fourth port is open on the other end face of the monobloc body of the valve module, opposite to its other end face in which the first port is open. With this arrangement, the fourth port is able to communicate with the first port and to detect the pressure at the compressor outlet.

According to yet another preferred feature of the invention, the monobloc body of the valve module is a machined block having the general form of a parallelepiped, formed in a metallic material, preferably an aluminium alloy.

According to the invention in a second aspect, a valve module is provided for a refrigerant circuit, the module having any or all of the features thereof mentioned above.

Further features and advantages of the invention will appear more clearly on a reading of the following detailed description of some preferred embodiments of the invention, which is given by way of non-limiting example only and with reference to the accompanying drawings.

DESCRIPTION OF PREFERRED EMBODIMENT OF THE INVENTION

Figure 1:
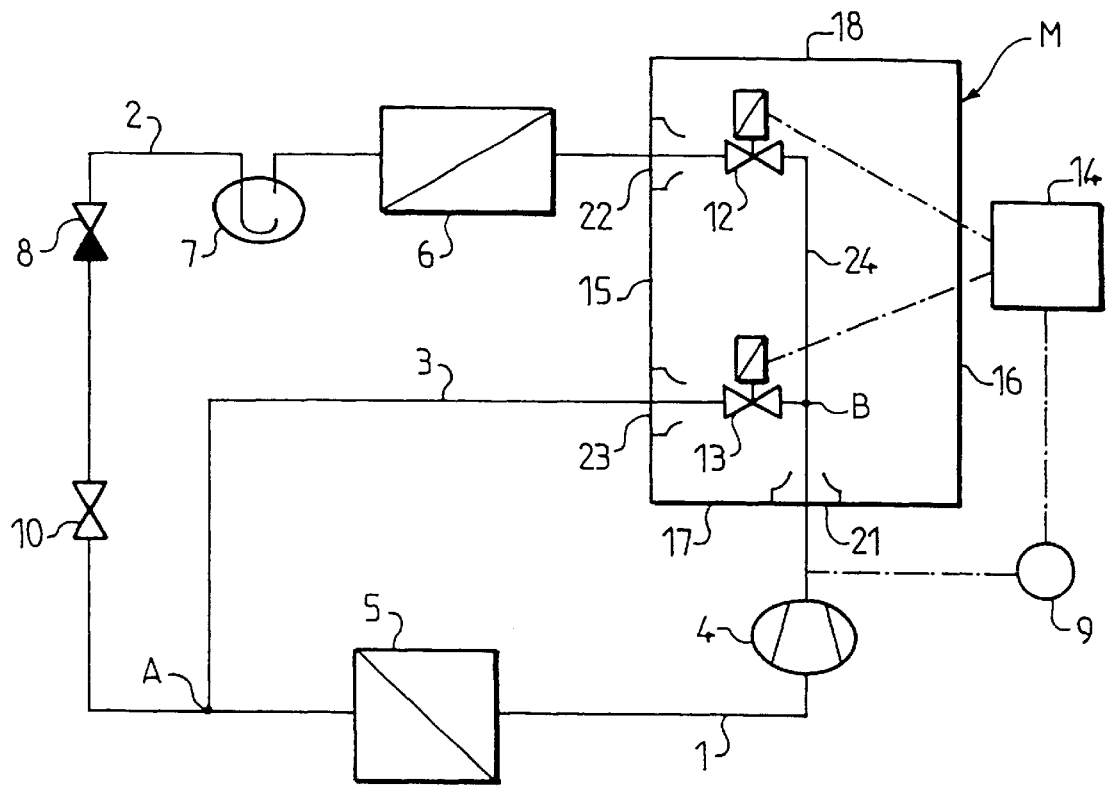
FIG. 1 is a circuit diagram for a refrigerant fluid circuit in accordance with the invention, comprising a valve module which incorporates a stop valve and a variable-opening valve.

FIG. 1 shows a circuit through which there flows a refrigerant fluid, the circuit being suitable for air conditioning and space heating in the cabin of a motor vehicle. The fluid flowing in the circuit is one which is such that it passes from the liquid state to the gaseous state by absorbing heat, and from the gaseous state to the liquid state by yielding heat, as is normally the case in vehicle air conditioning installations.

The various components of the circuit are connected in three circuit branches 1, 2 and 3, which are joined together at two junction points A and B. The branch 1 contains a compressor 4 which drives the fluid in that branch from the point A to the point B, and an evaporator 5 which is connected upstream of the compressor. A pressure sensor 9 detects the pressure of the refrigerant fluid at the outlet of the compressor 4. The circuit branch 2 contains, from the point B towards the point A, a condenser 6, a bottle or reservoir 7, a non-return valve 8, and a thermostatic expansion device 10.

In the circuit shown in FIG. 1, a two-way electromechanical valve 12, which acts as a stop valve, is connected in the circuit branch 2 between the point B and the condenser 6. In addition, a second electromechanical valve 13 is connected in the branch 3 between the points A and B. The opening of the valve 13 is variable, so that fluid flow through the valve can be regulated. The stop valve 12 and the variable opening valve 13 are controlled by a control module, or control unit, 14 which receives the signals from the pressure sensor 9.

For operation of the apparatus in the air conditioning mode, the module 14 opens the stop valve 12 and closes the variable opening valve 13. The refrigerant fluid then flows in the air conditioning loop of the circuit, which is a conventional air conditioning loop consisting of the circuit branches 1 and 2. More precisely, the fluid which is delivered by the compressor 4 passes through the junction point B and the stop valve 12, so as to reach the condenser 6, in which it condensed, thereby yielding heat to the ambient air, after which the fluid passes through the bottle 7 and the non-return valve 8 and is expanded in the thermostatic expansion device 10. The fluid evaporates in the evaporator 5, thereby cooling air which is to be delivered into the cabin of the vehicle. The gaseous refrigerant fluid leaving the evaporator 5 is once more aspirated by the compressor. In the heating mode of the apparatus, on the other hand, the stop valve 12 is closed and the variable opening valve 13 is opened. The fluid flows in the heating loop constituted by the circuit branches 1 and 3 (in which connection it will be noted that the heating branch 3 is a bypass branch, bypassing the condenser 6. On leaving the compressor, the fluid passes through the junction point B and the variable opening valve 13, remaining in the gaseous state, and then passes through the evaporator 5, in which it yields heat to the air for delivery into the cabin. The fluid then returns to the compressor.

The variable opening valve 13 enables the (additional) heating branch 3 to be isolated in the air conditioning mode of operation. In addition, the valve 13 enables the expansion of the gas in the heating branch to be controlled in the (additional) heating mode, according to the adjustment of the opening of the valve 13.

The valve 13 also enables two other functions to be performed, namely control of expansion by the control module 14, or electronic regulator, and control of the time delay preceding opening of the expansion device in a charging mode, which enables the quantity of refrigerant fluid which will be charged to be better controlled.

The electromechanical valve 13 is preferably either a gate valve or a proportional valve, governed by a pulse width modulated (PWM) signal, that is to say a pulsed signal with modulation of the pulse width. A valve of this type enables the mass flow of refrigerant fluid flowing through the valve to be put at any value in the range from 0% to 100% of its nominal mass flow.

In the heating mode, when the pressure of the refrigerant fluid in the heating loop 1,3 is abnormally low, because there is an insufficient mass of fluid in this loop, or because the temperature is low, the variable opening valve 13 is closed. The compressor then draws, through the evaporator 5, fluid from the circuit branch 2, in particular from the bottle 7. The quantity of fluid in the heating loop therefore increases, and therefore so also does the pressure at the outlet of the compressor 4. When this latter pressure reaches the value required for opening the variable opening valve 13, a flow of fluid is established in the heating loop 1, 3. The fluid, in the liquid state, that may then be upstream of the evaporator 5 in the branch 1, evaporates. The pressure downstream of the non-return valve in the circuit branch 2 rises above the pressure upstream of the non-return valve, so that fluid ceases to be transferred out of the bottle 7.

The pressure at the outlet of the compressor 4 is monitored permanently by the pressure sensor 9, and its value is transmitted to the control module 14. If this pressure exceeds a datum value or safety threshold, a control module 14 causes a momentary opening of the stop valve 12, thus enabling some of the refrigerant fluid to be passed from the heating loop 1,3 into the condenser 6.

Figure 2:
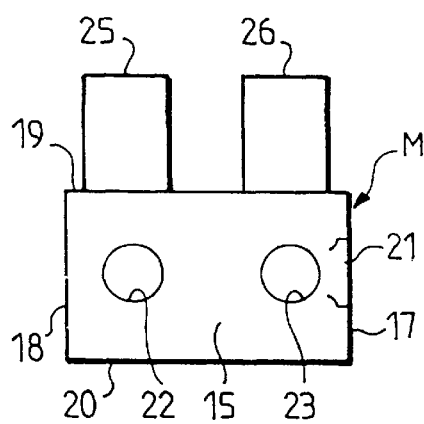
FIG. 2 is a side view of the valve module of FIG. 1.

As can be seen in FIG. 1, the stop valve 12 and the variable opening valve 13 are both contained in a modular component, or valve module, M which comprises a body made as a monobloc member in the general form of a parallelepiped, having two opposed main faces 15 and 16, two opposed end faces 17 and 18, an upper face 19, and a lower face 20 (FIG. 2).

The body of the valve module M has a first port 21 which is open in the end face 17, and which is arranged to be connected to the circuit branch 1 on the outlet side of the compressor 4. The module M also has two further ports 22 and 23 which are open in the main face 15 and which are arranged to be connected to the circuit branches 2 and 3 respectively. The ports 22 and 23 are in communication with the valves 12 and 13 respectively. A communication passage 24 is formed in the body of the valve module M so as to put the port 21, connected to the circuit branch 1, into communication with the two valves 12 and 13.

As can be seen in FIG. 2, the two valves 12 and 13 are actuated by electrical actuators 25 and 26 respectively, which are mounted on the upper face 19 of the module.

Figures 3, 4, 5:
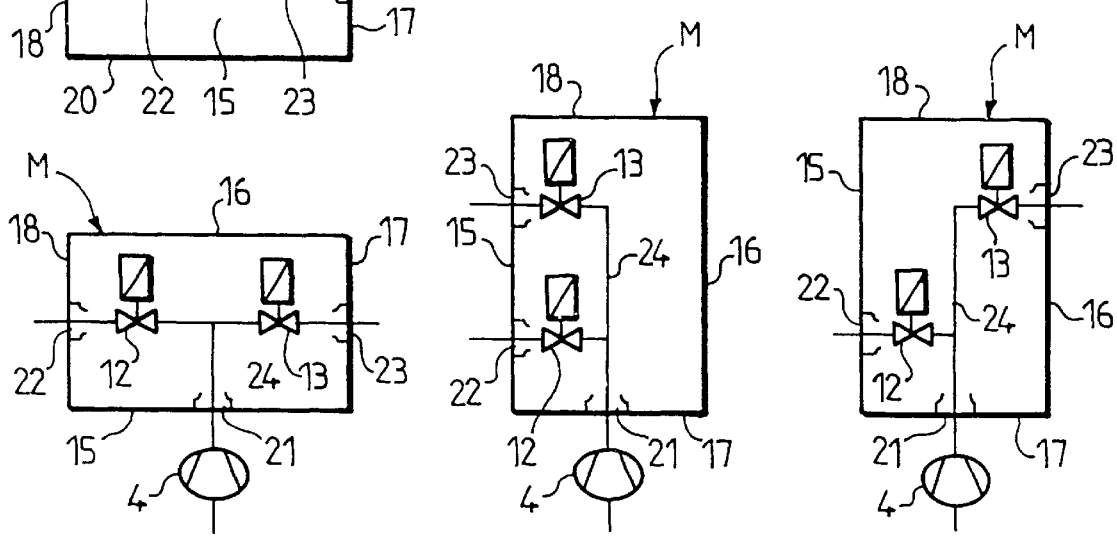
FIG. 3 is similar to part of FIG. 1, but shows diagrammatically a first modified version of the valve module.
FIG. 4 is similar to part of FIG. 1, but shows diagrammatically a second modified embodiment of the valve module.
FIG. 5 is similar to part of FIG. 1, but shows diagrammatically a third modified embodiment of the valve module.

In the version of the valve module shown in FIG. 3, the port 21 is open in the main face 15, while the ports 22 and 23 are open in the end faces 18 and 17 respectively.

In the further version shown in FIG. 4, the respective positions of the ports 22 and 23 are reversed as compared with the arrangement in FIG. 1. In other words, the positions of the two valves 12 and 13 are exchanged. Thus, a given valve module may be used as well in the embodiment of FIG. 1 as in the embodiment of FIG. 4, provided the valves 12 and 13 are substituted for each other.

In the further version shown in FIG. 5, the port 21 is again located on the end face 17 of the body, while the ports 22 and 23 are formed respectively in the two opposed main faces 15 and 16.

Figure 6:
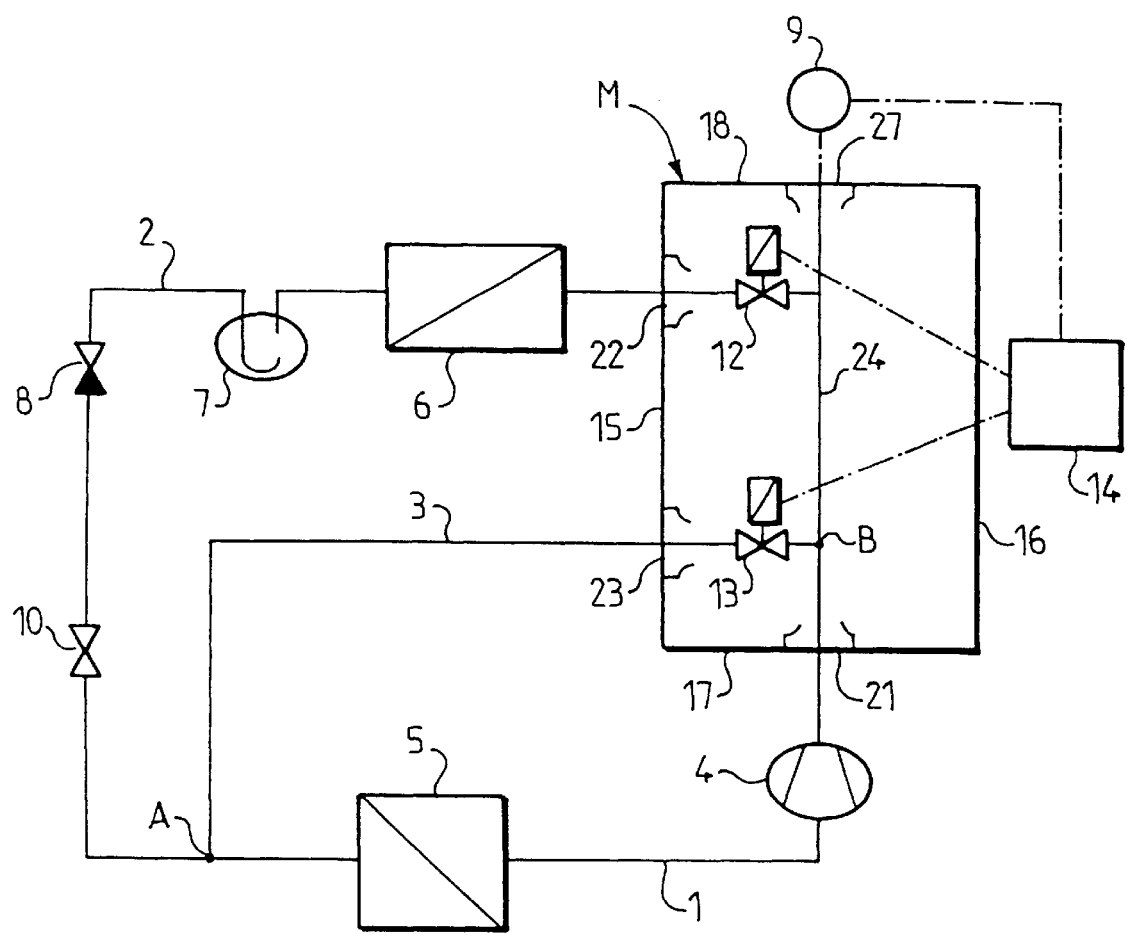
FIG. 6 is a circuit diagram for a refrigerant fluid in a further embodiment of the invention.

Reference is now made to FIG. 6, which differs from that of FIG. 1 only in the structure of the body of the valve module M. In this connection, the communication passage 24 is extended to the end face 18, so as to form a fourth port 27 which lies opposite the port 21. This port 27 enables the pressure sensor 9 to be connected with the communication passage 24, so that the sensor 9 is then in communication with the outlet of the compressor 4 via the passage 24.

Figure 7:
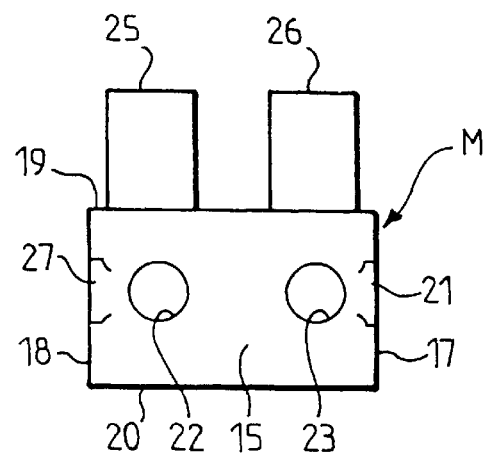
FIG. 7 is a side view of a valve module for incorporation in the circuit shown in FIG. 6.

FIG. 7 shows the general structure, of the valve module in the embodiment of FIG. 6. This valve module again has a monobloc body in the general form of a parallelepiped which is machined from a block of metal, in this example an aluminium alloy. The various ports 21, 22, 23 and 27 are in the form of bores which are extended into the body to enable the electromechanical valves 12 and 13 to be housed within the body. The actuators 25 and 26, in the form of electromagnets which actuate the valves 12 and 13, are again mounted on the upper face 19 of the module body. This face 19 is formed with sockets (not visible in the drawings) for fitting of the electrical actuators 25 and 26.

The invention is of course not limited to the embodiments described above by way of example. Thus for example it is not limited to a circuit having three branches as described above.

Also, in the case where the variable opening valve 13 is associated with a stop valve 12, with the two valves incorporated in a common valve module, different configurations of the module are possible, FIGS. 3 to 5 being merely three examples of such different configurations.

What is claimed is:

1. An apparatus for air conditioning and heating a motor vehicle, the apparatus comprising a refrigerant fluid circuit including an air conditioning loop, a heating loop, a monobloc body valve module adapted to contain a cooling valve;

wherein the heating loop comprises a heating branch separate from the air conditioning loop and a variable opening valve disposed within the heating branch and contained in the valve module, the valve configured to control both distribution and expansion of a refrigerant fluid in the heating branch, wherein the body is a metallic parallelepiped block.

2. An apparatus according to claim 1, further comprising:

a control means adapted to control the operation of the variable opening valve.

3. An apparatus according to claim 2, wherein said control means is a control unit.

4. An apparatus according to claim 3, further comprising measuring means connected to the control means, disposed in the circuit and adapted to measure the pressure of a refrigerant fluid at a selected point within the circuit.

5. An apparatus according to claim 3, wherein the said variable opening valve is an electromechanical valve selected from the group consisting of a gate valve and a proportional valve.

6. An apparatus according to claim 1, wherein the refrigerant fluid circuit comprises:

a main branch including an evaporator and a compressor downstream of the evaporator;

a cooling branch including a condenser;

wherein the heating loop comprising the heating branch and the main branch; and the cooling loop comprising the cooling branch and the main branch.

7. An apparatus according to claim 6, wherein the cooling branch further includes a first valve downstream of the compressor;

wherein the heating branch further includes a second valve, the second valve being the variable opening valve; and wherein the first valve and the second valve deliver said fluid from the main branch selectively into the cooling branch and heating branch.

8. An apparatus according to claim 6, further comprising:

a fourth port in the body of the valve module; and a pressure sensor connected to the fourth port.

9. An apparatus according to claim 7, further comprising a control unit adapted to control the first and the second valves.

10. An apparatus according to claim 5 wherein the body having (a) a first port for connection to the main branch, (b)

a second port for connection to the cooling branch, and (c) a third port for connection to the heating branch.

11. An apparatus according to claim 10, wherein the body of the valve module defines an internal passage configured to put the first port into communication with the first and second valves,
wherein the first valve is connected to the second port and
wherein the second valve is connected to the third port.

12. An apparatus according to claim 11, wherein the second and third ports are defined on a main face and the first port is defined on a first end face adjacent to the main face.

13. An apparatus according to claim 11, further comprising a pressure sensor connected to a fourth port in the body of the valve module the fourth port defined in a second end face opposite the first end face.

14. A device for an air conditioning installation comprising:
a heating loop with a compressor, an evaporator, and a variable opening valve downstream of the compressor and upstream of the evaporator;
a cooling loop with the compressor, a condenser, the evaporator, and a cooling valve upstream of the evaporator; and
a valve module adapted to contain the cooling valve and the variable opening valve, wherein the valve module is a metallic body machined in the general form of a parallelepiped block.

15. The device of claim 14, further comprising:
an actuator associated with the cooling valve and the variable opening valve; and
a control unit associated with the actuator;
wherein the control unit energizes the actuator to establish the heating loop and the cooling loop.

16. The device of claim 15, further comprising a sensor associated with the control unit, the sensor adapted to measure fluid pressure at a point within the air conditioning installation.

17. The device of claim 14, wherein the valve module comprises:
a body having a first face, a second face, a third face, a fourth face, a fifth face, and a sixth face, wherein the second, third, fourth and fifth faces are adjacent to the first face and the sixth face is opposite the first face;
a first port open in the first face;
a second port open in a face selected from a group consisting of the second face, the third face, the fourth face and the fifth face;
a third port open in a face selected from a group consisting of the second face, the third face, the fourth face and the fifth face;
at least one internal passage connecting the first port to the second port, and the first port to the third port;
wherein the variable opening valve is connected to the third port;
wherein the cooling valve is connected to the second port; and
wherein the compressor outlet is connected to the first port.

18. The device according to claim 14, wherein the module further comprises a fourth port in communication with the first port,
wherein the device further comprises a sensor adapted to measure pressure at the outlet of the compressor, said sensor being disposed in the fourth port.

19. The device of claim 17, wherein the device further comprises a first actuator associated with the cooling valve and a second actuator associated with the variable opening valve;
wherein the valve module further comprises at least two actuator ports open in a face selected from a group consisting of the second face, the third face, the fourth face and the fifth face; and
wherein each of the actuators is disposed in one of the actuator ports of the valve module.

20. The device of claim 17, wherein the second port is open in a second port face, and a third port is open in a third port face opposite the second port face.

21. The device of claim 17, wherein the second port and the third port are open in the same face.

22. A method for an air conditioning installation having a heating loop with a compressor, an evaporator, and a variable opening valve between the compressor and the evaporator, and a cooling loop with the compressor, a condenser, and the evaporator, the method comprising:
selectively establishing said heating loop and said cooling loop by coordinately controlling the cooling valve and the variable opening valve;
measuring fluid pressure at a point within the air conditioning installation;
transmitting the fluid pressure to the control unit;
transmitting a control signal from the control unit to the actuator as a function of fluid pressure.

23. An apparatus for air conditioning and heating a motor vehicle, the apparatus having a refrigerant fluid circuit including (1) an air conditioning loop and (2) a heating loop, the apparatus comprising:
a valve module;
a variable opening valve disposed in the valve module and configured to control both distribution and expansion of a refrigerant fluid in the heating loop; and
a cooling valve disposed in the valve module adapted to control flow in the air conditioning loop;
wherein the valve module is a metallic body machined in the general form of a parallelpiped block.

24. The apparatus of claim 23, further comprising:
a sensor adapted to measure the pressure of a refrigerant fluid at a selected point within the circuit; and
a control unit, associated with the sensor, adapted to control the variable opening valve.

* * * * *